US012097542B2

(12) United States Patent
Schaupp et al.

(10) Patent No.: US 12,097,542 B2
(45) **Date of Patent: *Sep. 24, 2024**

(54) FLUID PUMP HAVING SELF-CLEANING STRUCTURE

(71) Applicant: Q.E.D. Environmental Systems, Inc., Dexter, MI (US)

(72) Inventors: John F. Schaupp, Sylvania, OH (US); Donald Lee Schultz, Jackson, MI (US); Matthew Thomas McKeown, Fowlerville, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,914

(22) Filed: Nov. 7, 2022

(65) Prior Publication Data

US 2023/0053955 A1 Feb. 23, 2023

Related U.S. Application Data

(63) Continuation of application No. 16/434,803, filed on Jun. 7, 2019, now Pat. No. 11,529,658, which is a (Continued)

(51) Int. Cl.

*B08B 5/02* (2006.01)
*F04B 9/12* (2006.01)

(Continued)

(52) U.S. Cl.

CPC .................. *B08B 5/02* (2013.01); *F04B 9/12* (2013.01); *F04B 53/16* (2013.01); *B05B 1/005* (2013.01);

(Continued)

(58) Field of Classification Search

CPC .... B08B 5/02; F04B 9/12; F04B 53/16; F04B 2205/09; F04B 2205/503; F04B 2207/02;

(Continued)

(56) References Cited

U.S. PATENT DOCUMENTS

| | | | | | |
|---|---|---|---|---|---|
| 950,968 | A * | 3/1910 | Stout | F04F 1/06 | 417/128 |
| 2,083,039 | A * | 6/1937 | Searls | F04B 33/00 | 239/153 |

(Continued)

FOREIGN PATENT DOCUMENTS

| | | | |
|---|---|---|---|
| AU | 609427 | B2 | 5/1991 |
| CN | 1633322 | A | 6/2005 |

(Continued)

OTHER PUBLICATIONS

Extended European Search Report regarding EP 18890477.5, dated Apr. 23, 2021.

(Continued)

*Primary Examiner* — Wesley G Harris
(74) *Attorney, Agent, or Firm* — Kinney & Lange, P.A.

(57) ABSTRACT

A pneumatically driven fluid pump apparatus is disclosed which includes a pump casing having an inner wall, a pump cap secured at a first end of the pump casing, and a liquid discharge tube in communication with the pump cap and extending at least partially within an interior area of the pump casing toward a second end of the pump casing, and where fluid is admitted into the pump casing at the second end. The pressurized airflow causes a swirling flow of the liquid within the interior area of the pump casing that helps to clean the interior area of the pump casing by liquid scrubbing action to dislodge debris adhered within the interior area of the pump casing and remove the debris up (Continued)

through the liquid discharge tube and out from the fluid pump apparatus during a liquid eject cycle.

17 Claims, 7 Drawing Sheets

Related U.S. Application Data continuation-in-part of application No. PCT/US2018/066144, filed on Dec. 18, 2018.

(60) Provisional application No. 62/607,732, filed on Dec. 19, 2017.

(51) Int. Cl.
*F04B 53/16* (2006.01)
*B05B 1/00* (2006.01)

(52) U.S. Cl.
CPC ..... *F04B 2205/09* (2013.01); *F04B 2205/503* (2013.01); *F04B 2207/02* (2013.01)

(58) Field of Classification Search
CPC .... B05B 1/005; F04F 1/08; F04F 1/06; E21B 43/121; B01D 21/267
See application file for complete search history.

(56) References Cited

U.S. PATENT DOCUMENTS

| | | | | |
|---|---|---|---|---|
| 5,147,185 | A | 9/1992 | Niehaus et al. | |
| 5,227,061 | A * | 7/1993 | Bedsole | B01D 21/0012 210/512.1 |
| 2003/0196952 | A1* | 10/2003 | Kampfen | B01D 21/267 210/512.3 |
| 2009/0257888 | A1 | 10/2009 | Harrington | |
| 2011/0308812 | A1* | 12/2011 | Bullen | E21B 43/121 166/372 |
| 2012/0061073 | A1* | 3/2012 | Soni | E21B 31/00 166/99 |
| 2016/0356134 | A1* | 12/2016 | Ramirez | F04F 1/08 |
| 2019/0308226 | A1* | 10/2019 | Schaupp | B08B 5/02 |

FOREIGN PATENT DOCUMENTS

| | | | | |
|---|---|---|---|---|
| CN | 2784642 | Y | 5/2006 | |
| CN | 2916214 | Y | 6/2007 | |
| CN | 100503053 | C | 6/2009 | |
| CN | 201287125 | Y | 8/2009 | |
| CN | 105275766 | A | 1/2016 | |
| CN | 106030115 | A | 10/2016 | |
| CN | 106246518 | A | 12/2016 | |
| CN | 106536852 | A * | 3/2017 | E21B 43/12 |
| CN | 107162104 | A | 9/2017 | |
| GB | 1459009 | A | 12/1976 | |
| GB | 2502640 | A * | 12/2013 | B01D 21/0009 |
| JP | 2003139097 | A | 5/2003 | |
| WO | 8703938 | A1 | 7/1987 | |
| WO | 2018057417 | A1 | 3/2018 | |

OTHER PUBLICATIONS

First Chinese Office Action for CN Application No. 201880065600.2, Dated Aug. 19, 2021, p. 15.
International Search Report and Written Opinion for corresponding International Application No. PCT/US2018/066144 mailed Apr. 8, 2019, 8 pp.
International Search Report and Written Opinion regarding International Application No. PCT/US2020/035679, dated Sep. 17, 2020.
International Preliminary Report on Patentability for PCT Application No. PCT/US2018/066144, Dated Jun. 23, 2020, p. 6.
International Preliminary Report on Patentability for PCT Application No. PCT/US2020/035679, Dated Dec. 7, 2021, p. 10.

* cited by examiner

FLUID PUMP HAVING SELF-CLEANING STRUCTURE

CROSS-REFERENCE TO RELATED APPLICATION(S)

This application is a continuation of U.S. application Ser. No. 16/434,803 filed Jun. 7, 2019, which in turn is a continuation-in-part of PCT International Application No. PCT/US2018/066144, filed Dec. 18, 2018, which in turn claims the benefit of U.S. Provisional Application No. 62/607,732, filed on Dec. 19, 2017, the disclosures of which are incorporated herein by reference in their entireties.

FIELD

The present disclosure relates to pumps, and more particularly to a fluid pump having a self-cleaning air inlet which helps to clean internal surfaces of the pump during each fluid ejection cycle of the pump.

BACKGROUND

The statements in this section merely provide background information related to the present disclosure and may not constitute prior art.

Pneumatically driven fluid pumps are used in a wide variety of applications to pump out various types of fluids from wellbores. Often the fluids being pumped include contaminants which can cause a build-up of contaminants or sludge-like material on the inside surfaces of the pump. This is highly undesirable from a number of respects, not the least of which is that it can lead to malfunctioning of the pump if the build-up becomes sufficient to interfere with moving parts within the pump. Fluid pumps used in wellbores often make use of a float that must be able to move freely up and down an elongated rod positioned within a pump housing. The float is used to signal when sufficient fluid has accumulated within the pump housing so that valving can be used to implement a fluid ejection cycle. The build-up of contaminants along the interior wall surface of the pump housing may eventually interfere with free movement of the float within the pump housing.

To address the above concerns, it traditionally has been necessary to periodically remove the pump from its associated wellbore, disassemble it, clean it, reassemble it, and then reinstall it in the wellbore. As will be appreciated, this can be time consuming and costly in terms of the man hours required for such a maintenance sequence.

Accordingly, there is presently a strong interest in providing fluid pumps that incorporate a design and construction which is less susceptible to the build-up of contaminants within the pump, and which will allow the pump to operate over significantly longer time intervals before requiring removal, disassembly and cleaning.

SUMMARY

This section provides a general summary of the disclosure, and is not a comprehensive disclosure of its full scope or all of its features.

In one aspect the present disclosure relates to a pneumatically driven fluid pump apparatus. The apparatus may comprise a pump casing having an inner wall, a pump cap secured at a first end of the pump casing, and a liquid discharge tube in communication with the pump cap and extending at least partially within an interior area of the pump casing toward a second end of the pump casing, and where fluid is admitted into the pump casing at the second end. A fluid discharge tube may be included which is in communication with the pump cap for receiving liquid collected within the pump casing and discharged through the liquid discharge tube. The pump cap may include an airflow inlet for receiving a pressurized airflow from an external pressurized air source, where the pressurized airflow is used to help displace liquid collecting within the pump casing upwardly through the liquid discharge tube. A flow channeling subsystem may also be included which is in communication with the airflow inlet and operably associated with the pump cap, and exposed to an interior area of the pump casing. The flow channeling subsystem directs the pressurized airflow received through the airflow inlet towards the inner wall of the pump casing to create a swirling airflow within the pump casing that extends along at least portions of the inner wall, the swirling airflow moving in a circumferential swirling fashion toward the second end of the pump casing, which entrains fluid within the pump casing causing a swirling fluid flow within the pump casing. The swirling fluid helps to clean the inner wall of the pump casing as the fluid is forced into and through the discharge tube during a fluid eject cycle.

In another aspect the present disclosure relates a pneumatically driven fluid pump apparatus. The apparatus may comprise a pump casing and a pump cap secured at a first end of the pump casing, and having an airflow inlet port configured to receive a pressurized airflow from a remote compressed air source. A liquid discharge tube may be included which is in communication with the pump cap, and which extends at least partially within an interior area of the pump casing toward a second end of the pump casing, and where liquid is admitted into the pump casing at the second end. The apparatus may further include a fluid discharge tube in communication with the pump cap for receiving liquid collected within the pump casing and discharged through the liquid discharge tube, and routing the received liquid to an external reservoir or location. The pump cap may include a flow channeling subsystem having an airflow nozzle in communication with the airflow inlet, and also with the interior area of the pump casing, which directs the pressurized airflow toward an inner wall of the pump casing to create a circumferential swirling airflow within the pump casing. An air deflector may be included which is disposed in the pump casing adjacent to the nozzle and in the path of the pressurized airflow discharged from the nozzle. The air deflector further helps to create the circumferential swirling airflow within the pump casing which entrains liquid having collected within the pump casing to create a swirling, helical fluid flow which operates to help clean the inner wall of the pump casing, while also forcing the swirling liquid upwardly into and through the liquid discharge tube during a fluid ejection cycle.

In still another aspect the present disclosure relates to a method for cleaning an interior area of a pump casing of a pneumatically driven fluid pump. The method may comprise using a pump cap secured to a first end of an elongated, tubular pump to receive a pressurized airflow from a remote pressurized air generating device, to be admitted into an interior area of the pump casing. The method may further comprise using a liquid discharge tube in communication with the pump cap and extending at least partially within an interior area of the pump casing toward a second end of the pump casing, to receive liquid which has been admitted into the pump casing at a second end of the pump casing. The method may further include directing the pressurized airflow received at the pump cap through the pump cap into a flow channeling subsystem operably associated with the pump cap, and disposed within the pump casing, and using the flow channeling subsystem to turn the pressurized airflow into a circumferential swirling airflow within the pump casing. The circumferential swirling airflow entrains fluid to create a swirling, helical flow within the pump casing which moves along an inner wall of the pump casing, towards the second end of the pump casing. The circumferential swirling airstream thus cleans the inner wall of the pump casing as the liquid within the pump casing is forced upwardly into, and through, the liquid discharge tube, and out from the pump casing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
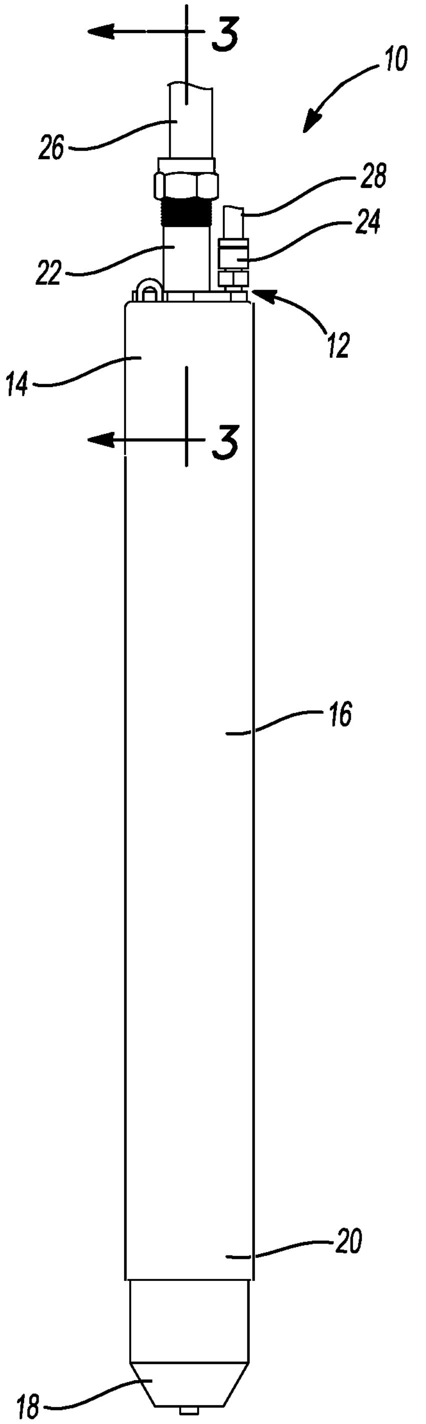
FIG. 1 is an elevational side view of one example of a pneumatically driven fluid pump in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1 a pump 10 is shown in accordance with one embodiment of the present disclosure. In this example the pump 10 is of the type that is well suited for use in a wellbore. The pump 10 includes a pump cap 12 secured to a first (i.e., upper) end 14 of a pump casing 16. A screened inlet 18 is disposed at a second (i.e., lower) end 20 of the pump casing 16. The pump cap 12 has a fluid discharge fitting 22 and an air inlet fitting 24 (e.g., a well-known quick release style fitting) which are both coupled to the pump cap 12. A fluid discharge conduit 26, typically a flexible plastic, elastomeric or rubber tubing, is coupled to the fluid discharge fitting 22 (for example, a well-known quick release style fitting) for transmitting fluid collected in and discharged from the pump 10 out from a wellbore. An air inlet conduit 28, which may also be a rigid or flexible conduit made from plastic, elastomer, rubber or any other suitable material, is coupled to the air inlet fitting 24 and supplies pressurized air into an interior chamber of the pump 10 formed within the pump casing 16 during a fluid pumping or ejection cycle. While not shown in FIG. 1, the pump 10 often incorporates a float assembly which is used to sense a level of fluid within the wellbore in which the pump 10 is located, and controls valving associated with the fluid discharge fitting 22 and the air inlet fitting 24 to control the admission and interruption of the pressurized airflow into the interior of the pump 10, and thus the cyclic ejection of fluid collected within the pump 10. However, the pump 10 of the present disclosure is not limited to use with pumps that employ a float, but rather may be used with any other type of fluid level sensing system.

Figure 2:
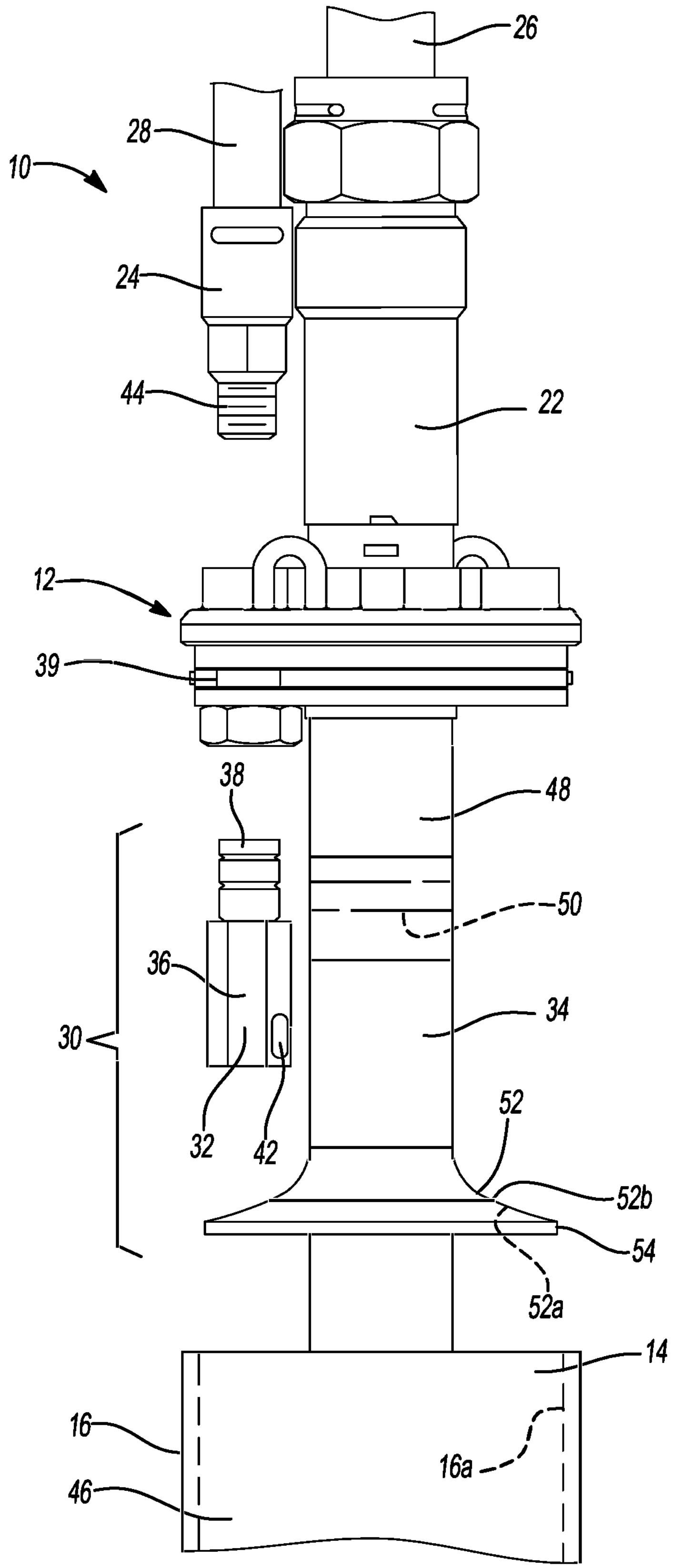
FIG. 2 is an exploded side view of an upper portion of the pump shown in FIG. 1 illustrating various component of an air inlet assembly of the pump.
Figure 4:
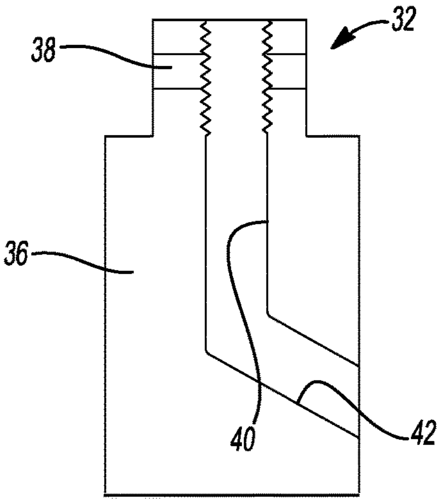
FIG. 4 is a cross section view of a nozzle that forms a portion of an air inlet cleaning subsystem for the pump.

In FIG. 2, internal components of the pump 10 that form a self-cleaning air inlet subsystem 30 (hereinafter simply "air inlet subsystem 30") are shown. In this example the air inlet subsystem 30 forms a flow channeling subsystem and may include a nozzle 32 and an air deflector 34. In this example the nozzle 32 includes a main body portion 36 and a threaded end portion 38 that may be threadably engaged with a threaded bore 39 in the pump cap 12. With brief reference to FIG. 4, the nozzle 32 includes a bore 40 having a hole 42 formed in the main body portion 36, for example by drilling or any other form of machining, which communicates with the bore 40. The hole 42 may be formed parallel to the bore 40 or at some angle which is non-parallel to the bore 40, depending on the placement of the nozzle 32 within the pump casing 16. In one example the hole 42 may be formed at an angle to the bore 40 so that it is angled downwardly toward the deflector 34 when the nozzle 32 is installed in the pump 10.

With continued reference to FIG. 2, the air inlet fitting 24 includes a threaded portion 44 which engages within the threaded bore 39 so that pressurized air may be communicated from air inlet conduit 28, through the threaded bore 39 and into an interior area 46 of the pump casing 16. A rigid fluid discharge tube 48 extends longitudinally into the interior area 46 of the pump casing 16 for initially receiving fluid ejected from the interior area 46 during a fluid ejection cycle.

With further reference to FIG. 2, the air deflector 34 in this example forms a sleeve-like element that may be inserted over a portion of the fluid discharge tube 48 and secured thereto via pin 50 or similar threaded component that extends through the fluid discharge tube 48. Alternatively the air deflector 34 may be secured by adhesives, by a physical hose-style clamp, or by any other suitable means that maintains it positioned at a desired location along the length of the fluid discharge tube 48 and does not impede fluid flow through the fluid discharge tube. Still further, it is possible for the air deflector 34 to be formed such that it is able to snap into a groove formed on the fluid discharge tube 48, or could be formed to be positioned over a circumferential groove in the fluid discharge tube and held thereon with a suitable clamp. Still further, it is possible that the fluid discharge tube 48 and the air deflector 34 may be formed as a single integrated component, for example as a single piece component molded from plastic using a suitable molding process (e.g., injection molding or spun formed).

The air deflector 34 may include an outwardly flaring portion 52 at a lower end thereof which is sized to have a diameter just slightly smaller than an internal diameter of the outer pump housing (e.g., by a few millimeters). This enables pressurized air received from the air inlet conduit 28 to be deflected and formed into a circumferentially swirling airflow by the air deflector 34 that flows past an outermost edge 54 of the air deflector 34 and downwardly towards a lower end of the pump casing 16, to enable substantially all of the fluid which has accumulated in the interior area 46 to be ejected upwardly through the fluid discharge tube 48.

In another embodiment, the swirling airflow may be formed by presenting the pressurized airflow flowing through the nozzle 32 such that the pressurized airflow is presented to an underside 52*a* of the outwardly flaring portion 52. This will involve orientating the nozzle 32 to direct the pressurized airflow through the hole 42 in an upwardly directed, or upwardly/laterally directed manner, toward the underside 52*a*. Still further, a swirling airflow within the pump casing 16 may be achieved by presenting the pressurized airflow leaving the hole 42 directly at an inside wall surface 16*a* of the pump casing 16 either normal to the inside wall or at some non-perpendicular angle to the inside wall surface 16*a*. Still further, the swirling airflow may be created by directing the pressurized airflow leaving the hole 42 at the fluid discharge tube and/or at a groove-like or undulating outer surface of the fluid discharge tube, or even smooth outer surface of the fluid discharge tube. Still further, a helix may be machined on the inside wall surface 16*a* and/or a baffle positioned within the pump casing 16, to help create the swirling airflow 56. Still further combinations of the above features may be used, for example, a helix groove formed on the inside wall surface 16*a* of the pump casing 16 along with the air deflector 34, and also a grooved/undulating outer surface on an exposed section of the fluid discharge tube 48. Thus, two, three or more distinct airflow generating/enhancing features may be employed within the pump casing 16 to create the swirling airflow.

It will be appreciated that the nozzle 32 could be formed as a manifold with two or more holes 42 spaced apart angularly and/or vertically to even further shape the swirling airflow. Still further, if the nozzle 32 is formed as a manifold with two or more holes 42, it could be formed so as to wrap partially around the fluid discharge tube 48.

Figure 3:
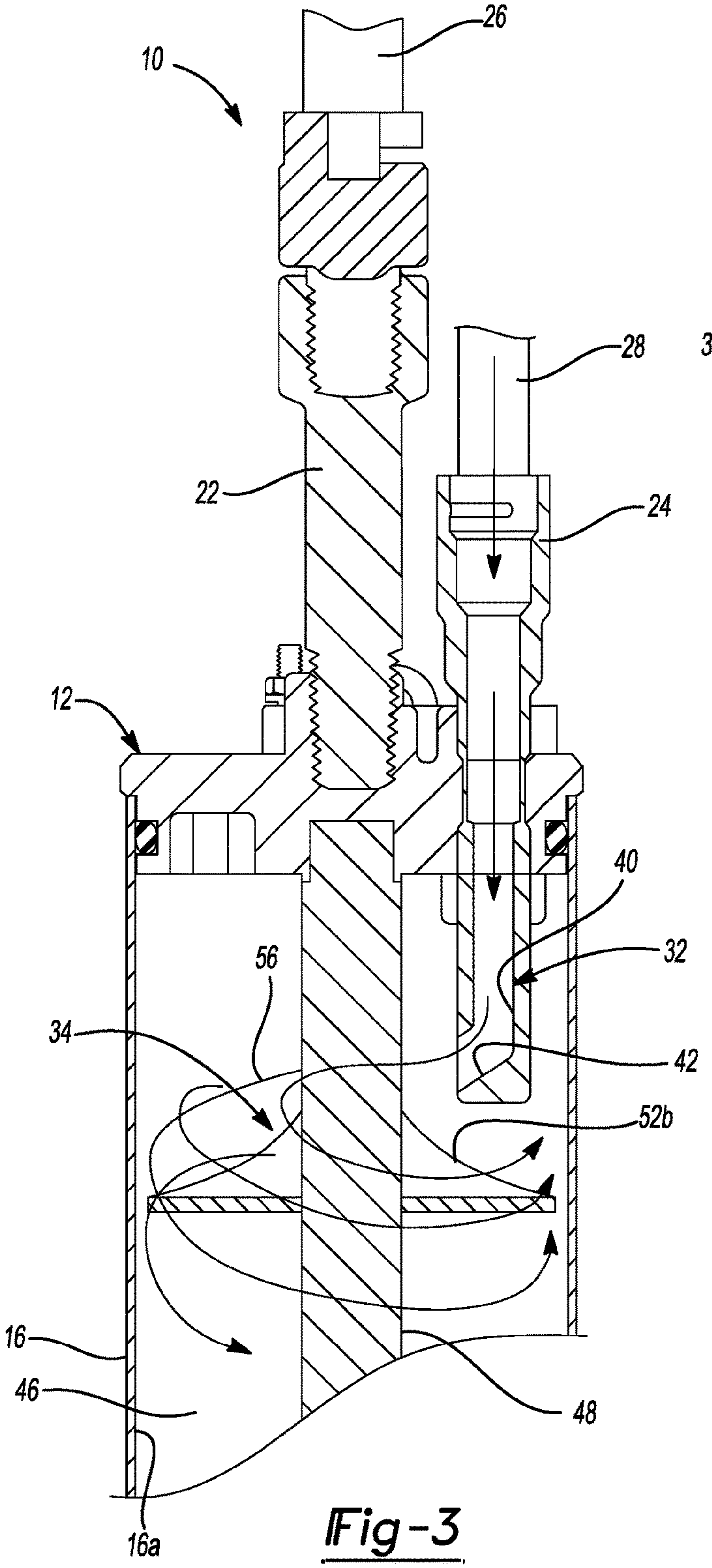
FIG. 3 is a side cross sectional view taken in accordance with section line 3-3 in FIG. 1 illustrating how pressurized air is admitted to an interior of a housing of the pump during a fluid discharge cycle and is caused to flow air and then water in a swirling action by the inlet subsystem to effectively scrub an interior wall of the pump casing.

Referring to FIG. 3, example of the circumferential, swirling airflow is indicated by lines 56. This example assumes that the circumferential, swirling airflow 56 is created as pressurized air exits the hole 42 in the nozzle 32 and is deflected on an upper surface 52*b* of the air deflector 34. The flared shape of the air deflector 34, and particularly the outwardly flaring portion 52, induce the swirling motion to the airflow and helps to direct the airflow into contact with the inside wall surface 16*a* of the pump casing 16. This forms a powerful swirling air column which creates a rotating air and water scrubbing action that removes debris and contaminants which have adhered to the inside wall surface 16*a* of the pump casing 16 as the fluid level within the pump casing 16 drops during a fluid ejection cycle. The rotating air/water column also serves to loosen debris at the pump inlet (i.e., hidden beneath screened inlet 18 in FIG. 1) at the second (i.e., lower) end of the pump casing 16. Moreover, this scrubbing action occurs during every fluid ejection cycle.

Figure 5:
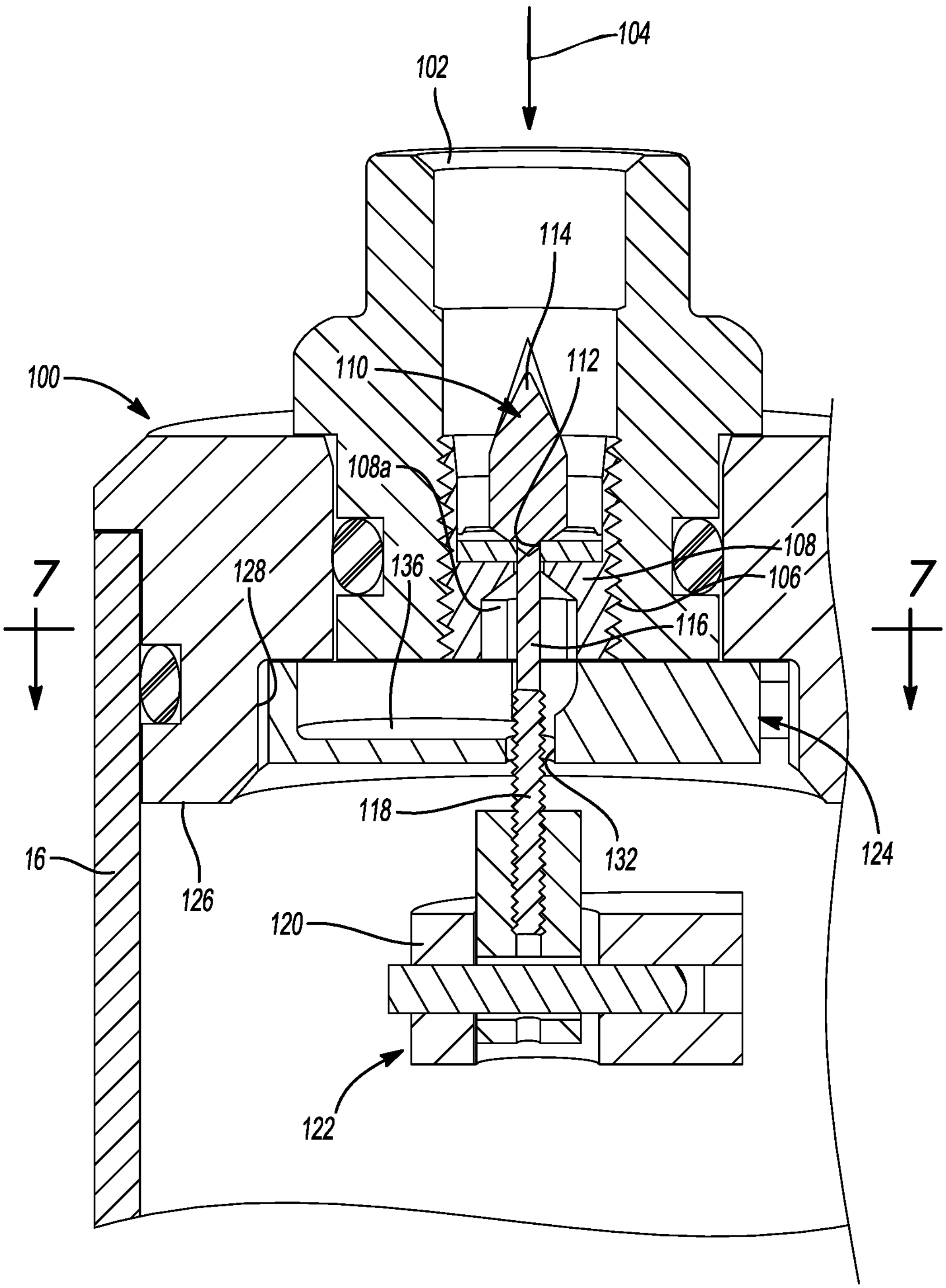
FIG. 5 is a side cross sectional view of a portion of a pneumatic pump, such as the pump of FIG. 1, illustrating a pump cap which incorporates a flow channeling subsystem to create a circumferential, swirling air stream within the interior of the pump casing to help clean the interior wall of the pump casing.

Referring to FIG. 5, a pump cap 100 is shown in accordance with another embodiment of the present disclosure for use with the pump 10. The pump cap 100 in this embodiment includes an air inlet port 102 into which a compressed air stream, represented by arrow 104, is directed from an external compressed air source (not shown in the Figure). The pump inlet port 102 includes a lower threaded portion 106 into which a threaded valve seat component 108 may be threaded. The valve seat component 108 includes an enlarged recess 108*a* in communication with the inlet port 102. Disposed within the inlet port 102 is a valve element 110 which is able to seat on a valve seat 112 of the valve seat component 108. The valve element 110 includes a tapering nose portion 114, an unthreaded shaft portion 116, and a threaded shaft portion 118. The threaded shaft portion 118 is coupled to a connecting member 120 of a pivot lever 122, which itself forms a portion of a conventional control rod subassembly (not shown). The control rod assembly is a conventional subsystem which is commonly used in float actuated pneumatic pumps to control a valve element, for example valve element 110, in accordance with vertical movement of a float element when predetermined "pump full" or "pump empty" levels have been reached in the pump.

Figure 6A:
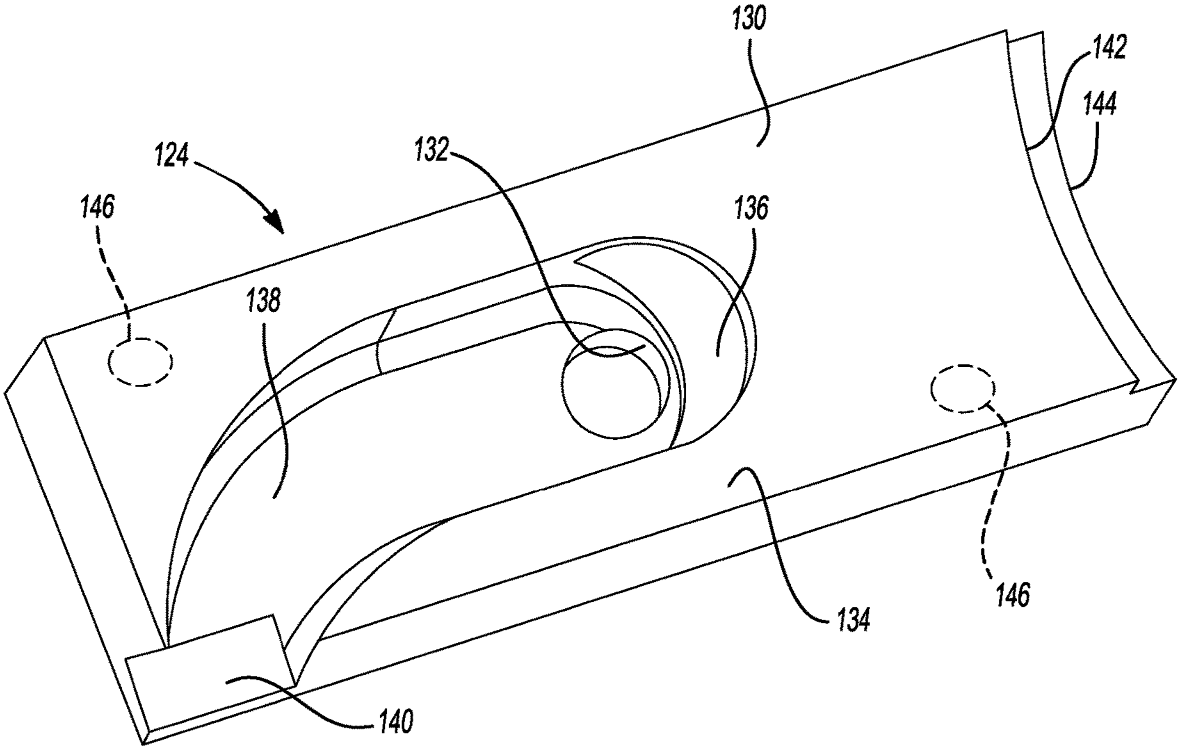
FIG. 6*a* is a perspective view of just the flow channeling subsystem shown in FIG. 5.

Referring to FIGS. 5 and 6*a*, the pump cap 100 advantageously includes a flow channeling subsystem 124 for turning the compressed air stream 104 into a swirling, rotational airstream, as the compressed air stream 104 exits adjacent an undersurface 126 of the pump cap 100. As visible in FIG. 5, the flow channeling subsystem 124 rests within a recessed area 128 of the undersurface 126.

With specific reference to FIG. 6*a*, a body portion 130 of the flow channeling subsystem 124 includes a circular opening 132 having a diameter sufficient to just enable the threaded shaft portion 118 of the valve element 110 to pass there through unrestricted. An upper surface 134 of the body portion 130 includes a semi-circular recessed portion 136 adjacent the circular opening 132. The upper surface 134 can also be seen to include a curving flow channel 138 formed therein, which communicates with the semicircular recessed portion 136, and which terminates at a ramped surface 140. An inward end 142 of the flow channeling subsystem 124 may have a radiused edge 144 for conforming to a discharge tube (not shown) depending from the undersurface 126 of the pump cap 100.

The flow channeling subsystem 124 may be formed from a suitably high strength plastic, from metal or any other material which is well suited for use in a pneumatically actuated fluid pump. As shown in FIG. 6*a*, the flow channeling subsystem 124 may include through holes 146 which enable fastening elements, for example threaded screws (not shown), to extend through the body portion 130, and into threaded openings (not shown) in the undersurface 126 of the pump cap 100. Alternatively, a suitable adhesive may be used to secure the flow channeling subsystem 124 to the undersurface 126, or possibly an interference fit (i.e., press fit) may be used to latch the flow channeling subsystem into the recessed area 128 of the undersurface.

Figure 6B:
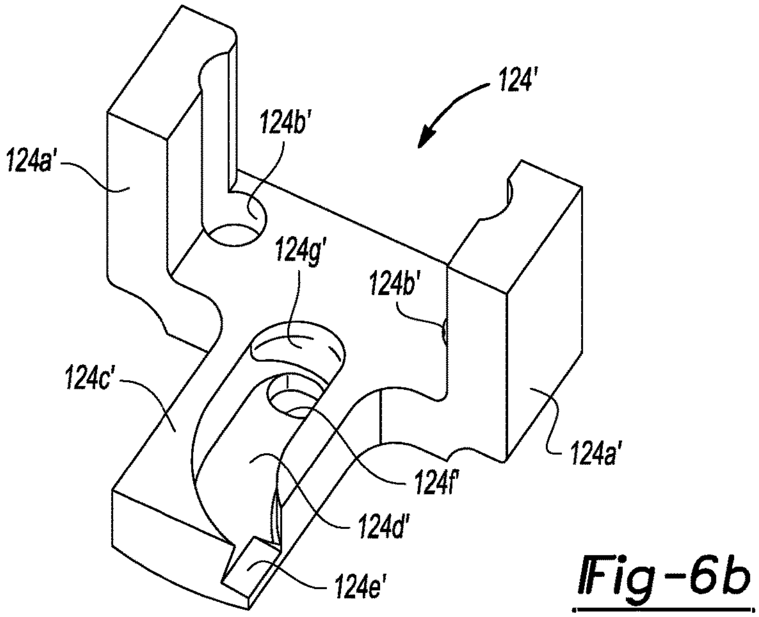
FIG. 6*b* is a perspective view of another embodiment of the flow channeling subsystem of the present disclosure which incorporates a pair of integrally formed leg portions to aid in angular alignment of the flow channeling subsystem during assembly to the pump cap.

FIG. 6*b* shows a flow channeling subsystem 124' in accordance with another embodiment of the present disclosure. The flow channeling subsystem 124' is constructed generally similar to the flow channeling subsystem 124, and operates in the same manner as the flow channeling subsystem 124, but also includes a pair of integrally formed, opposing, generally perpendicularly depending leg portions 124*a*'. The leg portions 124*a*' may include holes 124*b*' for enabling the flow channeling subsystem 124' to be secured with external threaded fastening screws (not shown) to the undersurface 126 of the pump cap 100. The leg portions 124*a*' may extend into correspondingly shaped recesses or notches (not shown) formed in the undersurface 126 of the pump cap 100 to allow quicker and more positive angular alignment of the flow channeling subsystem 124', relative to the pump cap 100, during assembly of the pump cap 100. An upper surface 124*c*' includes a curving flow channel 124*d*' which terminates in a ramped surface 124*e*'. A circular opening 124*f* is located at an inward most end of the curving flow channel 124*d*', and also may include a semi-circular recessed portion 124*g*'.

Figure 6C:
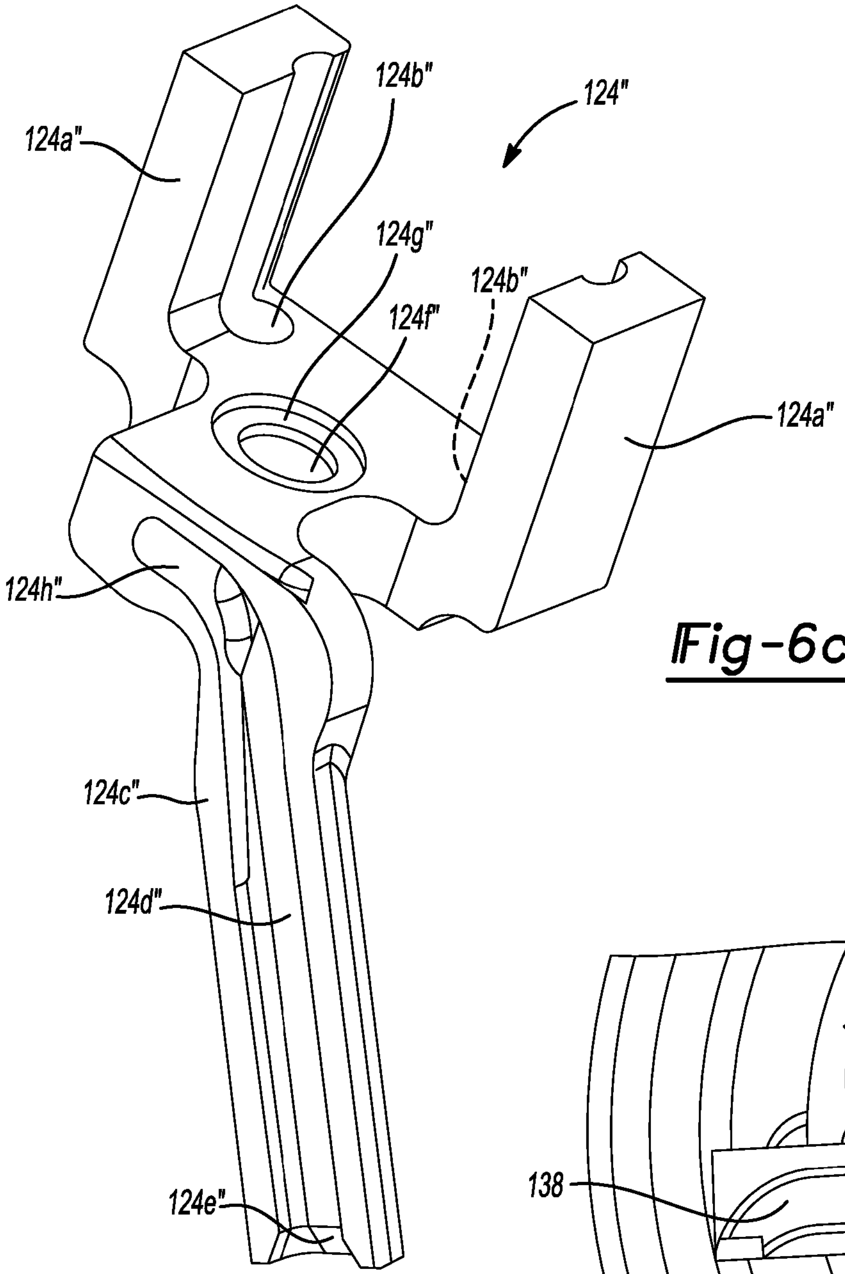
FIG. 6*c* is a perspective view of another embodiment of the flow channeling subsystem of the present disclosure which includes a lengthened flow channel.

FIG. 6*c* shows a flow channeling subsystem 124" in accordance with another embodiment of the present disclosure. Flow channeling subsystem 124" is similar in construction and operation to the flow channeling subsystem 124', and includes leg portions 124*a*", holes 124*b*", an upper surface 124*c*", a curving flow channel 124*d*" formed in the upper surface 124*c*", a ramped surface 124*e*", a circular opening 124*f*", and a semi-circular recessed portion 124*g*". The principal difference is that the addition of a tunnel 124*h*" which communicates with the circular opening 124*f*", and a significantly longer length for the flow channel 124*d*". The tunnel 124*h*" helps to turn the air flow stream in a slightly angular manner, and the lengthened, curving flow channel 124*d*" helps to discharge the air flow stream at a point much closer to an upper level of the fluid in the pump. This helps to generate an even stronger swirling, helical fluid flow within the pump casing 16 during a fluid discharge cycle.

Figure 7:
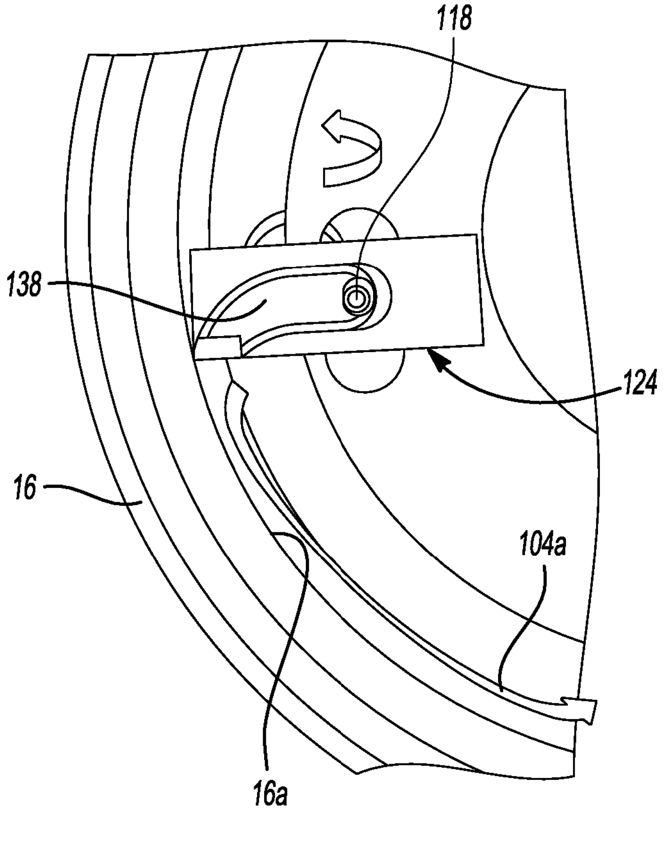
FIG. 7 is a simplified cross sectional view taken along section line 7-7 in FIG. 5 showing how the circumferential swirling air stream leaves the flow channeling subsystem and initially hugs the interior wall of the pump casing to help clean it of contaminants.

With reference to FIG. 7, operation of the flow channeling subsystems 124 and 124' will now be described. Merely for convenience, reference in the following description will be made to the flow channeling subsystem 124, with it being understood that the described operation is the same for the flow channeling subsystem 124'. When the valve element 110 is lifted into the open position, the compressed air stream 104 flows down the inlet port 102 past the valve seat 112, into the recessed area 108*a*, around the threaded shaft portions 116 and 118 of the valve element 110, and into curving flow channel 138. The semi-circular recessed portion 136 provides a half shaped dome area that compresses air stream 104 and substantially prevents it from passing completely through the opening 132. The semi-circular recessed portion 136 also helps the compressed air stream to make a 90 degree turn as it flows into the curving flow channel 138. As it leaves the curving flow channel 138, the compressed air stream 104 passes over the ramped surface 140, which helps to direct it slightly downwardly to clear the undersurface 126 of the pump cap 100. The compressed air stream 104 initially "hugs" an inner wall 16*a* of the pump casing 16 as it begins to form a circumferential swirling air stream, as indicated by line 104*a*, inside the pump casing 16. This circumferential swirling air stream 104*a* moves over the inner wall 16*a* of the pump casing 16 and entrains liquid which has collected inside the pump casing 16, creating a strong, swirling fluid flow along the inner wall 16*a*. This strong, swirling fluid flow helps significantly to clean the inner wall 16*a* by removing and/or dislodging contaminants which have adhered to the inner wall 16*a*. Portions of the circumferential swirling air stream 104*a*, which now has liquid entrained with it, also impact the discharge tube (not shown) and help to clean the exterior surface of the discharge tube, which can help to maintain free unobstructed movement of a float component, assuming the pump with which the pump cap 100 is being used is a float controlled pump. The swirling fluid generally follows the inner wall 16*a* of the pump casing as the fluid outside of the discharge tube (but within the casing 16) is pushed downwardly, while fluid at the entrance of the discharge tube is forced upwardly into the discharge tube to be ejected. The strong swirling flow created by the circumferential swirling airstream 104*a* thus helps to force the fluid within the pump into a swirling mass that effectively "scrubs" the inner wall 16*a* of the pump casing, thus dislodging and removing contaminants and debris which have adhered to the inner wall 16*a* of the pump casing 16 and/or on the float, as well as on the control lever arms, if such components are being used in the pump 10. Advantageously, the outer surface of the discharge tube is also cleaned by this swirling fluid flow.

Figure 8A:
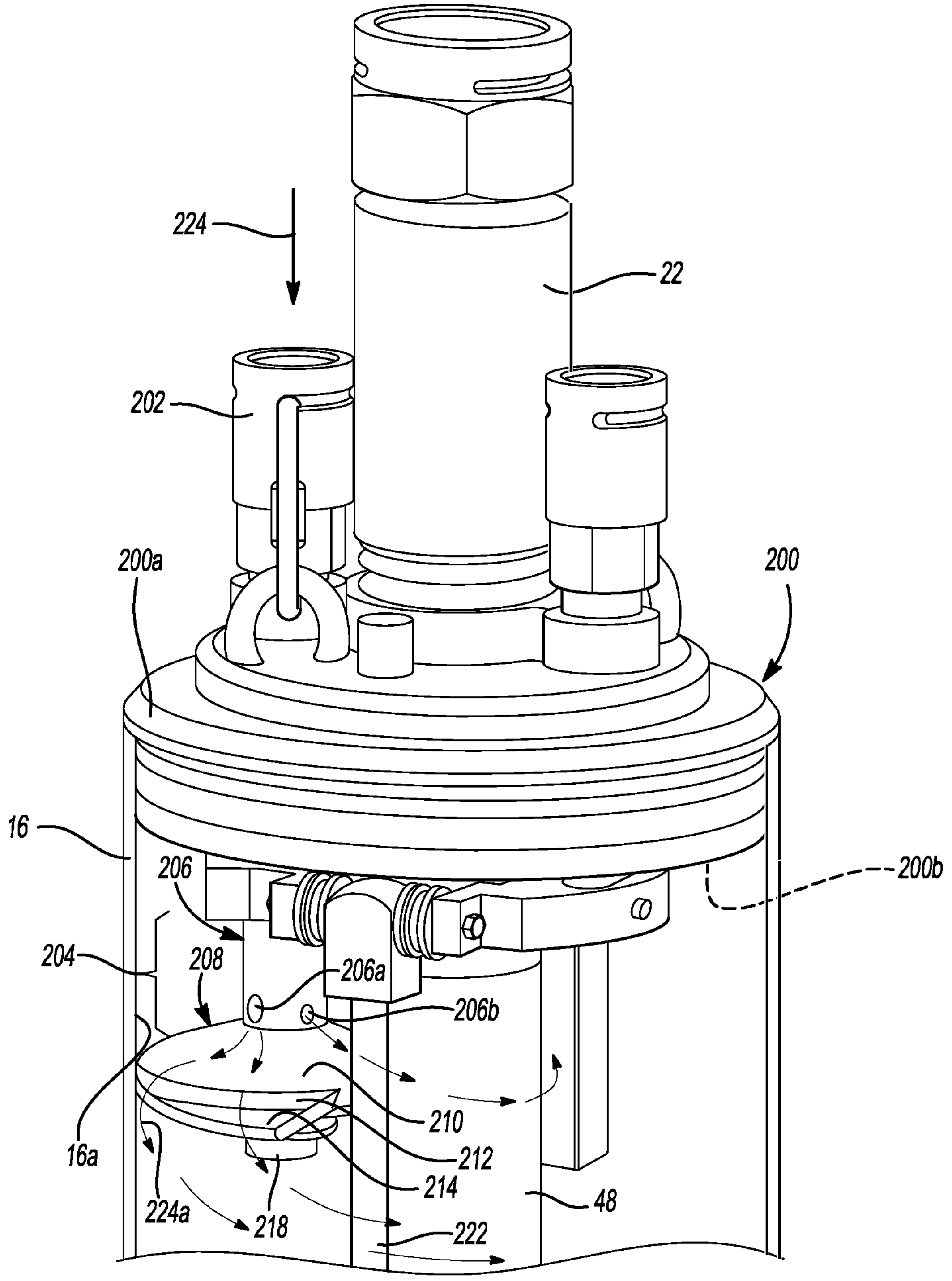
FIG. 8*a* is a side perspective view of a portion of the pump incorporating a different embodiment of the flow channeling subsystem which incorporates an airflow nozzle and an air deflector depending from the airflow nozzle.

Referring to FIG. 8*a*, a pump cap 200 in accordance with another embodiment of the present disclosure is shown for use with the pump 10. The pump cap 200 in this embodiment is especially well adapted to be used with a float operated pump and associated control rod, where vertical movement of the float causes vertical movement of the control rod when the fluid inside the pump reaches a predetermined upper level, which operates to control the opening and closing of a valve used to admit air into the pump 10 to implement a fluid discharge cycle.

Figure 8B:
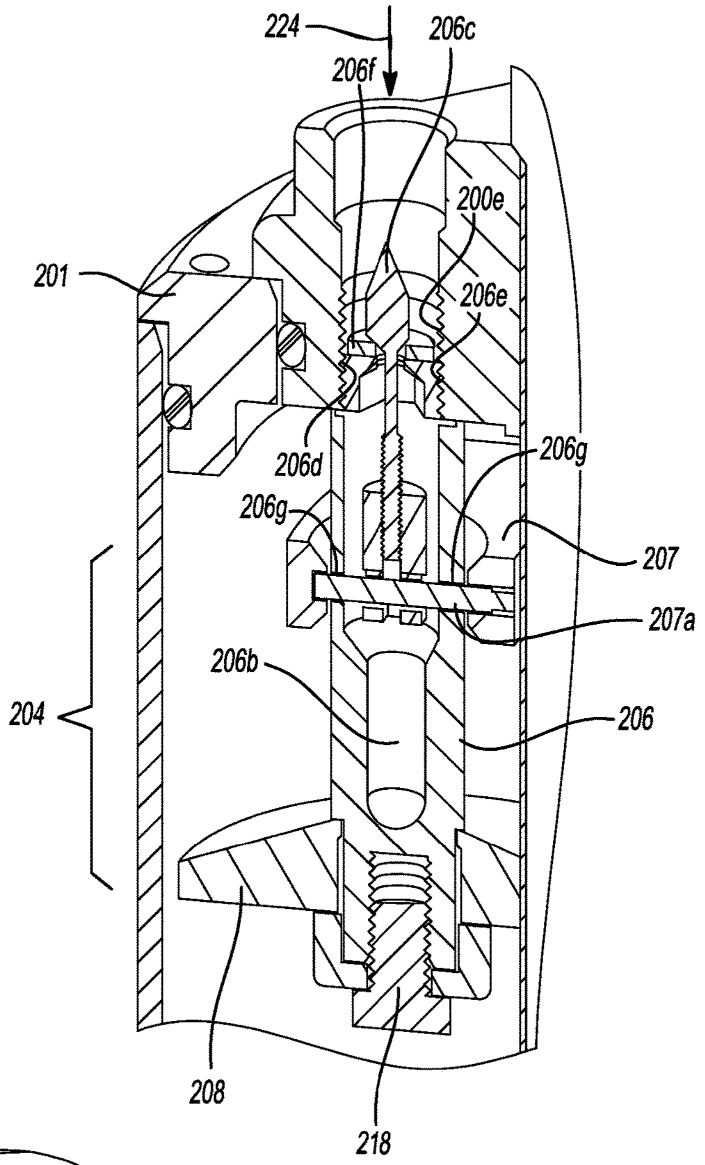
FIG. 8*b* is a side perspective view principally showing the flow channeling subsystem, and particularly the needle valve and its associated components located within the airflow nozzle.

From FIGS. 8*a* and 8*b*, the pump cap 200 is similar in some respects to the pump cap 100 in that it incorporates a body portion 200*a* having a pressurized air flow inlet 202. The air flow inlet 202 communicates a flow of compressed air 224 through a body 200*a* of the pump cap 200 into an airflow directing subsystem 204. The airflow directing subsystem 204 in this embodiment includes a nozzle 206 and an air deflector 208 positioned adjacent to the nozzle 206, and in the embodiment shown, depending and supported from the nozzle 206. The nozzle 206 depends from an undersurface 200*b* of the body 200*a* a short distance (e.g., preferably about 1.0 inch—6.0") into the pump casing 16. The nozzle 206 has first and second airflow exit ports 206*a* and 206*b* (FIG. 8*a*) at a lower end thereof. The airflow exit ports 206*a* and 206*b* may be circular or slot-like in shape, or may take any cross-sectional shape that best meets a particular application. In this example the airflow exit ports 206*a* and 206*b* are different diameters and pointed in different directions: airflow exit port 206*a* points at an angle, for example 30-60 degrees, toward (i.e., not directly at) the inner wall 16*a* of the pump casing 16, and is larger than the airflow exit port 206*b*. The airflow exit port 206*a* may have a diameter preferably between about 0.156 inch-0.218 inch, although this range may be tailored to meet the needs of a specific pump design or application. Airflow exit port 206*b* points at an angle, for example 3-10 degrees impinging and towards the fluid discharge tube 48, and may have a diameter of preferably about 0.125 inch to about 0.187 inch, which again may be varied to meet a specific application. Both of the airflow exit ports 206*a* and 206*b* may be formed such that they are angled slightly relative to a horizontal plane, rather than at 90 degree bends to a longitudinal axis of the nozzle 206 (i.e., similar to hole 42 of nozzle 32 in FIG. 4), to help channel the compressed airflow outwardly from the nozzle 204 in a slightly downward direction.

As seen in FIG. 8*b*, the nozzle 206 includes an airflow bore 206*b* having a needle valve 206*c* therein. An upper end of the nozzle 206 is secured to the undersurface 200*b* of the pump cap body 200*a* via a threaded end 206*d* which engages with a threaded bore 200*e* in the pump cap body 200*a*. Needle valve 206*c* is lifted off of a valve seat 206*f* at an upper end of the nozzle 206 via rotational movement of a pivot pin 207*a* of a pivot element 207. The pivot pin 207*a* extends through aligned openings 206*g* in the nozzle 206. As a float (not shown) reaches a predetermined upper level in response to a rising fluid level in the pump casing 16, this causes pivoting of the pivot element 207, which in turn causes the pivot pin 207*a* to lift the needle valve 206*b*. This enables the compressed air flow 224 from an external compressed air source to flow through the airflow bore 206*b* in the nozzle 206. As the float drops in response to the liquid in the pump casing being pumped up through liquid discharge tube 48 (FIG. 3), this eventually allows the needle valve 206*c* to drop down and rest on the valve seat 206*f* to close off the airflow path through the airflow bore 206*b* within the nozzle 206, after which a separate vent valve (not shown) may be opened to vent the interior area of the pump casing 16 either to atmosphere or to a vacuum line.

Figure 9:
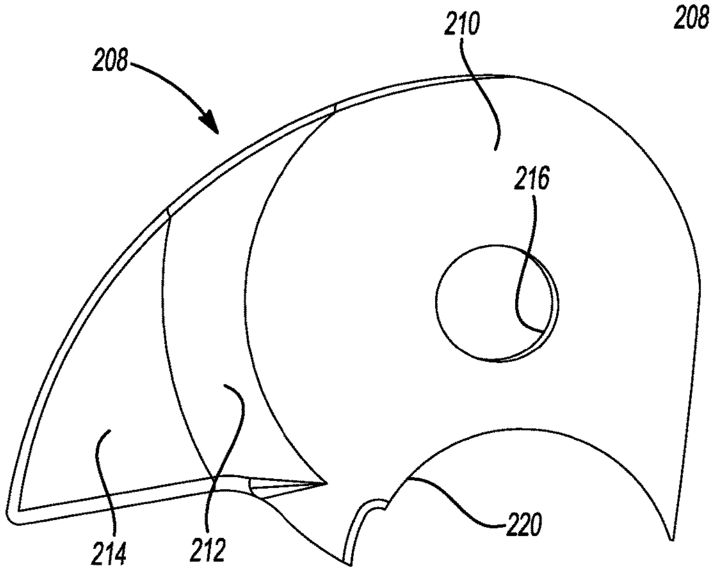
FIG. 9 is a plan view of just the air deflector of the flow channeling subsystem of FIGS. 8*a* and 8*b*.

Referring to FIGS. 8*a* and 9, the air deflector 208 has a tapering upper surface 210 with a downward transitioning portion 212 and an outermost extending portion 214. An opening 216 is formed and dimensioned to enable the air deflector 208 to fit over a distal end of the nozzle 206, which enables it to be supported from the nozzle. The air deflector 208 may be secured to the nozzle 206 by a threaded nut 218 which extends into a threaded bore 206*h* of the nozzle, as shown in FIG. 8*b*. From FIG. 9 it can also be seen that air deflector 208 includes a semi-circular cutout section 220 which is positioned closely adjacent the fluid discharge tube 48 when the pump cap 200 is fully assembled. Flat edge 214*a* of the air deflector 208 provides the clearance for the control rod.

Referring to FIG. 8*a*, during a fluid eject cycle of the pump 10, the compressed air stream 224 is directed from an external compressed air source into the airflow inlet 202 and travels downwardly into and through the nozzle 206. The air stream 224 exits the first and second airflow exit ports 206*a* and 206*b* and tends to follow a contour of the upper surface 210 of the air deflector 208 as it travels along the upper surface. The airflow exiting the first airflow exit port 206*a*, labelled 224*a* in FIG. 8*a*, is a larger volume of flow than the quantity of airflow exiting the second airflow exit port 206*b*. The airflow 224*a* turns downwardly slightly as it flows over the downward transitioning portion 212 and the outermost extending portion 214 of the air deflector 208, and begins to follow the inner wall 16*a* of the pump casing 16 as it entrains fluid within the pump casing 16 and causes the fluid to form a swirling, circumferential flow inside the pump casing. The swirling fluid flow tends generally clings to the inner wall 16*a* as it makes its way around the inner wall in a generally descending helical flow pattern, which helps to forcibly dislodge particle contaminants that may be sticking to the inner wall 16*a*. As the swirling fluid flow moves downwardly into the pump casing 16 it also pushes the water column within the pump casing 16 downwardly, which forces fluid up the discharge tube 48. This action occurs every time the pump 10 enters a fluid discharge (i.e., eject) cycle. The repeated cleaning action provided by the swirling fluid flow on each and every pump 10 discharge cycle helps to maintain the inner wall 16*a* free from contaminants that might otherwise build up to the point of interfering with movement of the internal components of the pump 10, such as a float.

At the same time that the airstream 224*a* is exiting the first airflow exit port 206*a*, a second distinct airstream 224*b* exits the second air exit port 206*b* and begins flowing down the upper surface 210 of the air deflector 208. The second airstream 224*b* flows around an outer surface of the discharge tube 48 and tends to cling to the outer surface for at least a portion of the circumference of the discharge tube 48. This helps to dislodge any particles that may be adhering to the outer surface of the discharge tube 48. A portion of the second airstream 224*b* also impinges the control rod 222 and creates a turbulent flow airflow condition around the control rod 222, which also helps to remove any contaminant particles that may be adhering to the control rod.

With regard to the air deflector 208, it will be appreciated that the precise shape and dimensions of this component may vary slightly depending on the diameter of the pump casing 16 it is used inside of, as well as its precise positioning relative to the control rod 22 and/or the discharge tube 48. Likewise, the airflow channeling subsystem 124 may vary somewhat depending on the diameter of the pump casing 16. For example, for a smaller diameter pump casing, the length of the curving channel 138 may be shortened and/or the curvature thereof made even more pronounced.

In each of the various embodiments discussed herein, it is a significant advantage that the implementation of the flow channeling subsystems formed by nozzle 32 and the air deflector 34 of FIG. 2, or the flow channeling subsystem 124, or the flow channeling subsystem 204, do not interfere with the collection of fluid inside the pump casing 16, and do not require modification to the valving (not shown) used to control the fluid ejection cycle, or any significant modifications to the pump cap 12, or the pump cap 100 or the pump cap 200. Still further, the nozzle 32 and the air deflector 34, as well as the flow channeling subsystem 124 and the flow channeling subsystem 204, do not necessitate enlarging the pump casing 16 or necessitate modifying the internal construction of the pump 10, or otherwise significantly add to the overall cost, complexity of construction, operation, or weight of the pump 10. The flow channeling subsystem formed by the air inlet subsystem 30, as well as the flow channeling subsystems 124 and 204, are all expected to significantly lengthen the intervals between cleanings of the pump 10, or potentially even eliminate entirely the need for periodic cleanings.

It will also be understood that components of the various embodiments described herein may be mixed and matched. For example the flow channeling subsystem 124 of FIG. 5 may be used in connection with the air deflector 208 and/or the nozzle 206. As one example, the air deflector 208 may be supported apart from, and elevationally below, the flow channeling subsystem 124 by a suitable element depending from the undersurface 126 of the cap 100. In this manner the circumferential swirling air stream 104*a* leaving the flow channeling subsystem 124 may be even further enhanced in its swirling flow motion by contact with the air deflector 208. As another modification, the air deflector 52 (FIG. 2) or 208 (FIGS. 8*a* and 8*b*) (FIG. 8*b*) may be removed entirely provided the corresponding nozzle (component 32 in FIG. 2 or 206 in FIGS. 8*a*/8*b*) is modified to create an angled flow which is able to create the swirling air stream at the nozzle's exit port. Still further, the needle valve 110 construction shown in FIG. 5 may be modified such that an air exit orifice of the threaded valve seat component 108 is shaped to project the exiting airstream in a circumferentially swirling fashion within the pump casing 16 along the inner wall **16*a* of the pump casing 16**.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The invention claimed is:

1. A pneumatically driven fluid pump apparatus for operating from an external pressurized air source to remove a liquid from a wellbore in a landfill, the fluid pump apparatus comprising:

a pump casing having a first end, a second end, and an inner wall defining an interior area between the first end and the second end, the pump casing configured to be at least partially submerged within the wellbore;

a pump cap secured at the first end of the pump casing, the pump cap including an airflow inlet for receiving a pressurized airflow from the external pressurized air source, wherein the pump cap is configured to emit the pressurized airflow into the interior area of the pump casing;

a liquid inlet located at the second end of the pump casing;

a liquid discharge tube that discharges the liquid upwardly, the liquid discharge tube extending at least partially within the interior area of the pump casing toward the second end of the pump casing, and wherein the liquid is admitted into the pump casing through the second end via the liquid inlet;

a valve operably associated with the pump cap, the valve actuatable between an open state, in which the pressurized airflow is permitted to flow from the airflow inlet to the interior area, and a closed state, in which the pressurized airflow is prevented from flowing from the airflow inlet to the interior area; and a flow channeling subsystem in communication with the airflow inlet and operably associated with the pump cap, the flow channeling subsystem configured to direct the pressurized airflow received through the airflow inlet into the interior area;

wherein during the open state the pressurized airflow exerts pressure on the liquid within the pump casing to drive the liquid downwardly within the interior area of the pump casing towards the second end and then upwardly within the liquid discharge tube, the pressurized airflow causing a swirling flow of the liquid within the interior area of the pump casing that helps to clean the interior area of the pump casing by liquid scrubbing action to dislodge debris adhered within the interior area of the pump casing and remove the debris up through the liquid discharge tube and out from the fluid pump apparatus during a liquid eject cycle.

2. The apparatus of claim 1, wherein the flow channeling subsystem includes a component secured to an undersurface of the pump cap which is in airflow communication with the airflow inlet, and which directs the pressurized airflow toward the inner wall of the pump casing in a circumferential swirling fashion.

3. The apparatus of claim 2, wherein the flow channeling subsystem includes a body portion having a curving airflow channel formed in one surface thereof.

4. The apparatus of claim 3, wherein the curving airflow channel terminates in a ramped surface for helping to redirect the pressurized airflow slightly downwardly towards the inner wall of the pump casing as the pressurized airflow leaves the flow channeling subsystem.

5. The apparatus of claim 1, wherein the flow channeling subsystem includes:

an airflow nozzle in communication with the airflow inlet and depending from an undersurface of the pump cap, the airflow nozzle having an airflow exit port; and an air deflector disposed adjacent to the airflow nozzle for redirecting the pressurized airflow leaving the airflow exit port toward the inner wall of the pump casing in a circumferential swirling fashion.

6. The apparatus of claim 5, wherein the air deflector is supported from a distal end of the airflow nozzle.

7. The apparatus of claim 6, wherein the airflow nozzle includes an additional airflow exit port for channeling a separate quantity of the pressurized airflow toward the liquid discharge tube.

8. The apparatus of claim 7, wherein the additional airflow exit port is smaller than the airflow exit port.

9. The apparatus of claim 5, wherein the airflow nozzle includes a needle valve responsive to movement of a control rod, for controllably opening and closing a flowpath through the airflow nozzle in response to an elevational position of the control rod.

10. The apparatus of claim 1, wherein the flow channeling subsystem includes:

a nozzle in communication with the airflow inlet; and an air deflector having an outwardly flaring portion configured to receive the pressurized airflow leaving the nozzle, and to redirect the pressurized airflow in a circumferential swirling flow toward the inner wall of the pump casing.

11. The apparatus of claim 10, wherein the air deflector is secured to and supported from the liquid discharge tube.

12. The apparatus of claim 11, wherein the air deflector includes a sleeve which fits over a portion of the liquid discharge tube such that the air deflector is positioned concentrically with the liquid discharge tube.

13. The apparatus of claim 10, wherein the nozzle projects from the pump cap into the interior area of the pump casing generally parallel to the liquid discharge tube.

14. The apparatus of claim 10, wherein the nozzle includes a threaded end portion which is threaded engaged with a threaded bore in the pump cap.

15. The apparatus of claim 10, wherein the nozzle includes:

a bore; and a hole in communication with the bore, where the hole directs the pressurized airflow received through the bore outwardly from the nozzle toward the inner wall of the pump casing to help initiate a circumferential swirling airflow.

16. A method for cleaning an interior area of a pump casing of a pneumatically driven fluid pump configured to remove a liquid from a wellbore in a landfill, the method comprising:

using a pump cap secured to a first end of the pump casing to receive a pressurized airflow, the pressurized airflow to be admitted into the interior area of the pump casing, the interior area defined by an inner wall of the pump casing, wherein the pump casing is elongated and tubular;

using a liquid discharge tube to receive the liquid which has been admitted into the pump casing at a second end of the pump casing, the liquid discharge tube in communication with the pump cap and extending at least partially within the interior area of the pump casing toward the second end of the pump casing;

actuating a valve operably associated with the pump cap to an open state;

directing the pressurized airflow received at the pump cap through the pump cap and into the interior area of the pump casing with the valve in the open state; and driving the liquid downward within the interior area and towards the second end of the pump casing and then upwards within the liquid discharge tube by the pressurized airflow, displacement of the liquid forming a swirling, helical flow of the liquid within the interior area of the pump casing such that the liquid moves along the interior area of the pump casing towards the second end of the pump casing and cleans the interior area of the pump casing by liquid scrubbing action within the pump casing to dislodge debris adhered within the interior area of the pump casing and such that the liquid collects the dislodged debris as the liquid swirls downward under pressure from the pressurized airflow and then removes the debris up through the liquid discharge tube and out from the pump casing.

17. A method for cleaning an interior area of pump casing of a pneumatically driven fluid pump configured to remove a liquid from a wellbore in a landfill, the method comprising:

receiving pressurized air through a pump cap secured to a first end of the pump casing and into the interior area of the pump casing, wherein the pump casing is elongated;

receiving the liquid from the wellbore in the landfill into the interior area which had been admitted into the pump casing at a second end of the pump casing;

actuating a valve operably associated with the pump cap to an open state;

directing the pressurized air through the pump cap and into the interior area of the pump casing based on the valve being in the open state; and driving the liquid downward within the interior area and towards the second end of the pump casing and then upwards within the interior area by the pressurized air, the liquid traveling upwards within the pump casing inside of a liquid discharge tube that extends within the pump casing, displacement of the liquid forming a swirling, helical flow of the liquid within the interior area of the pump casing such that the liquid moves along the interior area of the pump casing towards the second end of the pump casing and cleans debris from the interior area of the pump casing within the pump casing such that the liquid collects the dislodged debris as the liquid swirls downward under pressure from the pressurized airflow and then removes the debris up through the liquid discharge tube and out from the pump casing.

* * * * *